March 14, 1933.   I. H. JUDD   1,901,103
MEANS FOR TRANSPORTING VEHICLES AND THE LIKE
Filed Aug. 17, 1931    4 Sheets-Sheet 3
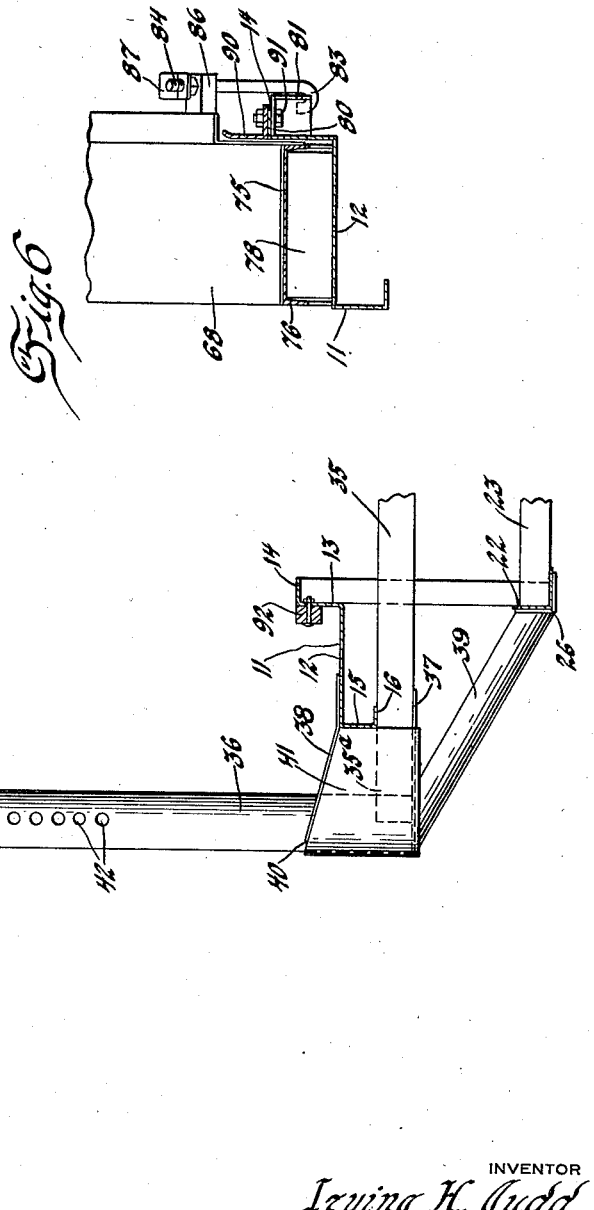
INVENTOR
Irving H. Judd
BY
ATTORNEYS March 14, 1933.   I. H. JUDD   1,901,103
MEANS FOR TRANSPORTING VEHICLES AND THE LIKE
Filed Aug. 17, 1931   4 Sheets-Sheet 4
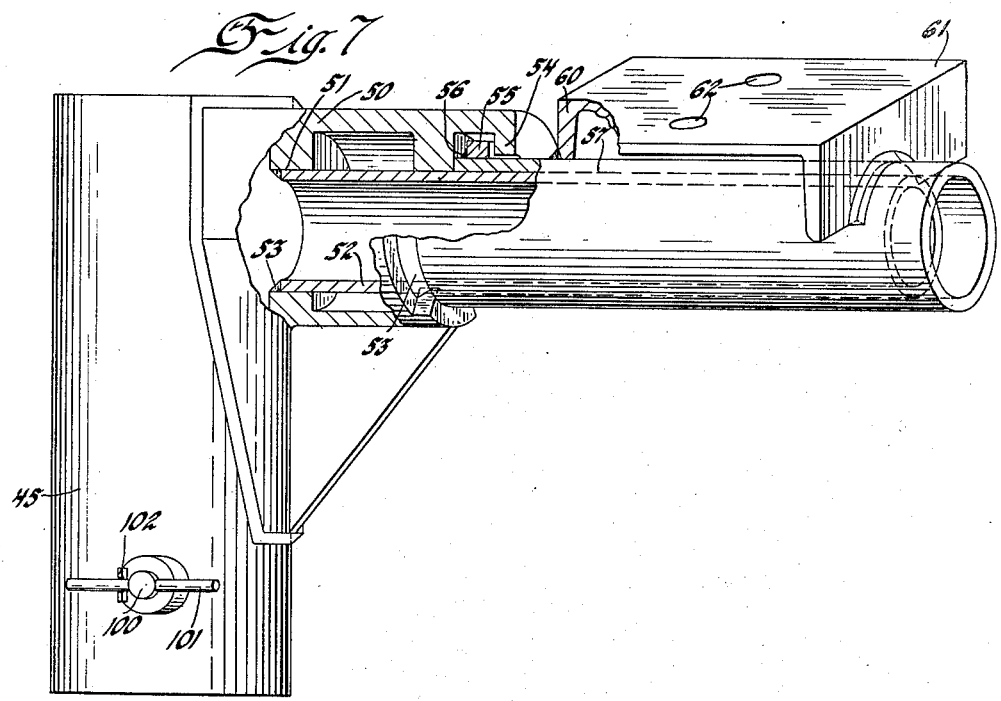
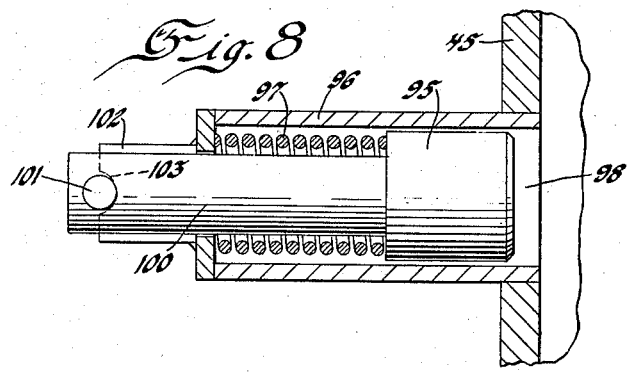
INVENTOR
Irving H. Judd
BY
ATTORNEYS Patented Mar. 14, 1933

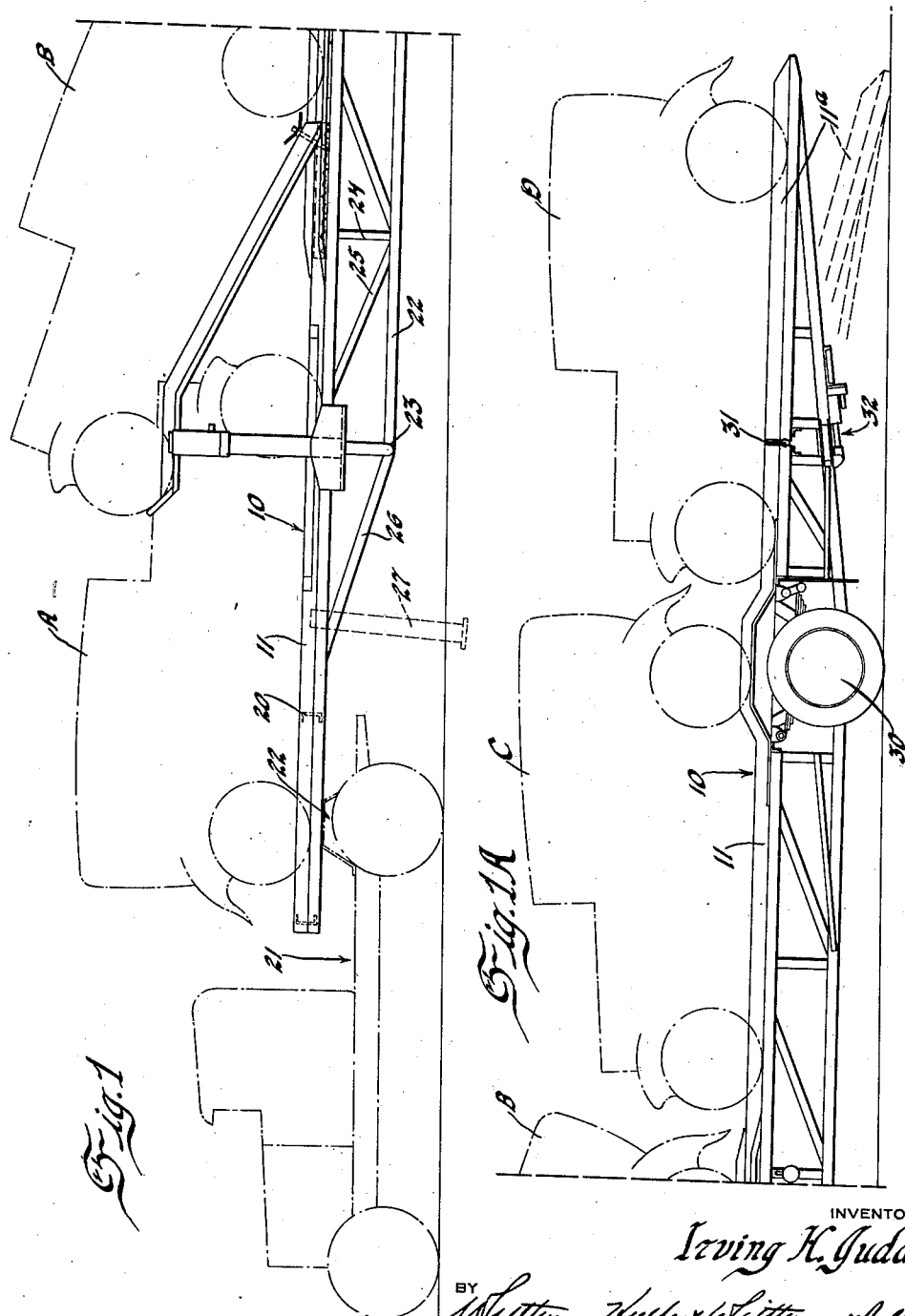

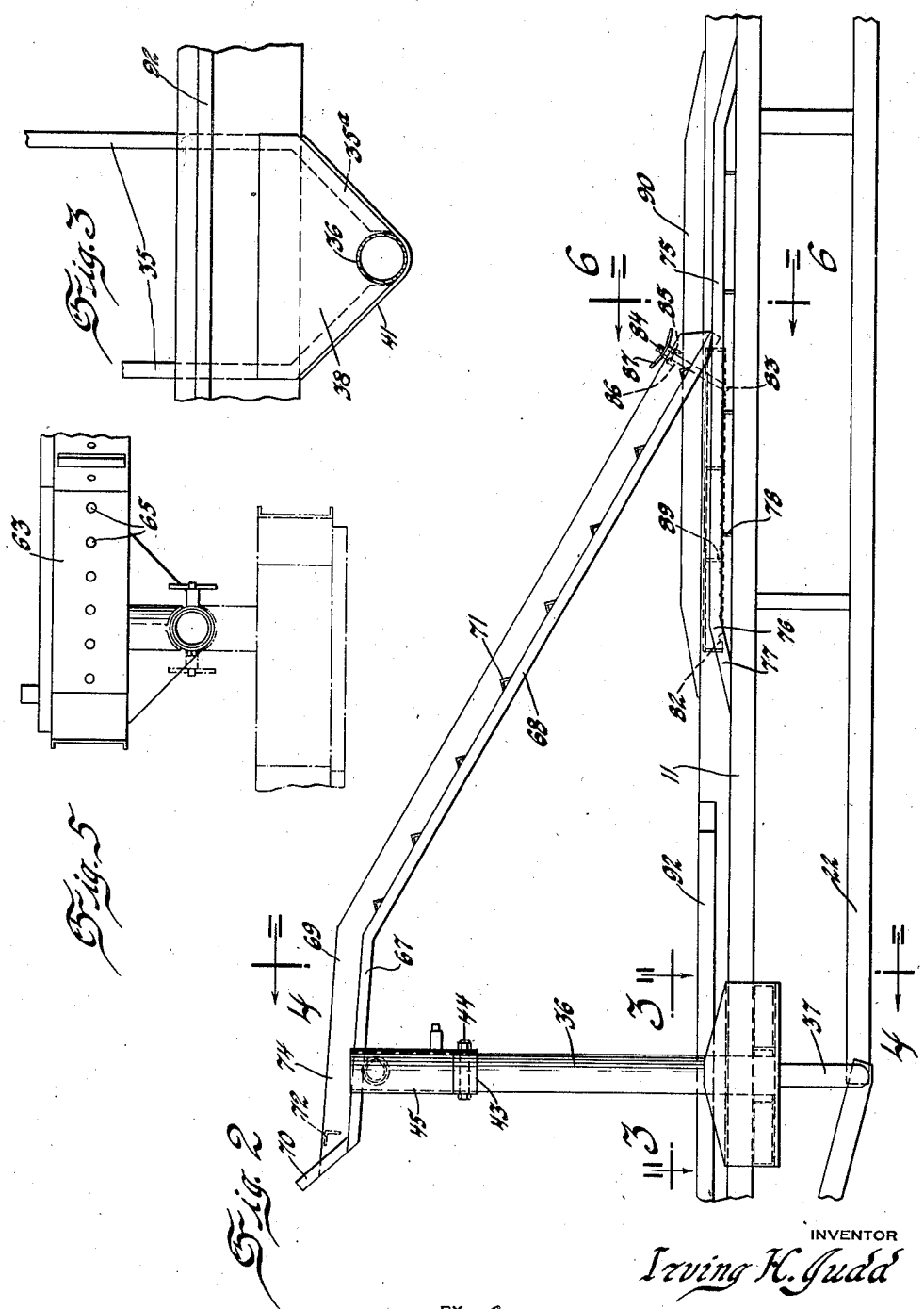

1,901,103

UNITED STATES PATENT OFFICE

IRVING H. JUDD, OF DETROIT, MICHIGAN, ASSIGNOR TO WHITEHEAD & KALES COMPANY, OF RIVER ROUGE, MICHIGAN, A CORPORATION OF MICHIGAN

MEANS FOR TRANSPORTING VEHICLES AND THE LIKE

Application filed August 17, 1931. Serial No. 557,662.

This invention relates to transportation means of the character used in the transportation of vehicles such as automobiles and the like.

One of the primary objects of this invention is to provide a transportation means of the above mentioned character which will be within the limits as to length and height set by the statutes and which will, however, be capable of transporting at one time at least four vehicles of relatively long wheel base.

The invention contemplates the provision of a transportation means which will include a main vehicle supporting runway or track and an auxiliary track or ramp which will provide for the supporting of vehicles to be carried in partially overlapping relation with respect to each other.

The invention has as a further object to provide a ramp or auxiliary runway of the above mentioned character which will be horizontally and vertically adjustable to provide for supporting cars of different lengths and heights.

Still further the invention contemplates the provision of an auxiliary runway or ramp which will be movable to operative and inoperative positions and which will be relatively light in construction whereby this movement of the runway or ramp may be effected by one person.

The invention also provides means for securing the elements of the auxiliary ramp in position with respect to each other and for positively maintaining these elements of the ramp in assembled positions during movement of the ramp to operative and inoperative positions.

Numerous other objects and advantages of this invention will become more apparent as the following description proceeds, particularly when reference is had to the accompanying drawings wherein:

Figs. 1 and 1A together constitute a side elevational view of a transportation means constructed in accordance with the teachings of this invention;

Fig. 2 is an enlarged elevational view of a portion of the structure shown in Fig. 1;

Fig. 3 is a fragmentary sectional view taken substantially on the line 3—3 of Fig. 2;

Fig. 4 is a sectional view taken substantially on the line 4—4 of Fig. 2.

Fig. 5 is a plan view of a portion of the structure shown in Fig. 2;

Fig. 6 is a sectional view taken substantially on the line 6—6 of Fig. 2;

Fig. 7 is a perspective view with parts broken away of a portion of the structure shown in Fig. 2; and Fig. 8 is an enlarged detail sectional view of a portion of the structure shown in Fig. 7.

Referring then particularly to the drawings wherein like reference characters designate corresponding parts throughout all views, the numeral 10 designates generally a semi-trailer, the general construction of which forms no part of the present invention. As illustrated, the semi-trailer comprises longitudinally extending structural elements 11. Two of these elements are provided, and they are spaced apart a sufficient distance to provide a track or runway for the wheels of vehicles to be transported.

Each structural element 11 is preferably of the general cross sectional shape shown in Fig. 4 of the drawings. By reference to this figure it will be noted that each element 11 comprises a horizontal web portion 12 which constitutes the track portion of the structural element. Each web portion is of sufficient width to receive dual wheels such as are found on some vehicles, and at its inner edge each web portion is provided with an upstanding flange 13 which terminates at its upper end in a laterally bent inwardly extending flange 14. At its outer edge each web portion is provided with a downwardly turned flange 15 which terminates at its lower end in an inwardly extending substantially horizontal flange 16.

The structural elements may be supported in any desired manner and constitute a portion of the framework of the semi-trailer. As brought out before, these structural elements extend the full length of the semi-trailer, and they are preferably secured at their forward ends to a suitable framework which includes the transversely extending channel members 20, this framework providing for the connection of the forward end of the semi-trailer to the rear end of a truck or the like 21 by a suitable fifth wheel construction designated generally by the reference character 22. Below the major portion of the structural elements 11 is a subframe construction which comprises longitudinally extending angle bars 22. These angle bars are connected at suitable points by cross angle bars 23, and the structural elements 11 are supported from the angle bars 22 by upright angle bars or the like 24. Each angle bar 24 is fixed at its lower end as by welding or the like to the adjacent elements 22 and 23 and is fixed at its upper end as by welding or the like to the underface of the flange 14 and the inner face of the flange 13 of the adjacent structural element 11. Cooperating with the uprights 24 are inclined brace members 25 which have their lower ends fixed to the members 22 and their upper ends fixed to the inner faces of the flanges 13.

Fixed to the forward ends of the angle bars 22 are inclined reinforcing members 26 which extend forwardly for connection to the frame which includes the members 20. A suitable support 27 is also preferably provided adjacent the forward end of the semi-trailer for supporting the same when disconnected from the truck 21. The structure of the track members and the means for supporting these track members as above described forms no part of the present invention, but is shown and claimed in my copending application Ser. No. 536,626 filed May 11, 1931.

Ground-engaging wheels 30 are provided to support the semi-trailer adjacent the rear end thereof in accordance with the usual practice, and, as illustrated in Fig. 1A of the drawings, the rear end portions 11ᵃ of the structural elements 11 are pivotally secured to the remaining portions of the structural elements as at 31 to provide for movement of the portions 11ᵃ from a substantially horizontal vehicle supporting position as shown in solid lines in Fig. 1A of the drawing to an inclined position as indicated in dotted lines in this figure. A suitable mechanism designated generally by the reference character 32 is provided for moving the members 11ᵃ to either of these positions, the arrangement being such that when the members 11ᵃ are in the inclined position they constitute skids to provide for the running of vehicles from the ground on to the track or runway formed by the elements 11. The mechanism 32 is described and claimed in my application Ser. No. 529,874, filed April 13, 1931, and forms no part of the present invention.

The present invention is directed more particularly to the provision of means providing an adjustable ramp or support intermediate the ends of the runway formed by the structural elements 11 whereby one of the vehicles to be transported may be supported in substantial overlapping relation with respect to an adjacent vehicle on the runway. It constitutes a further feature of this invention to so mount these auxiliary supports or ramps that the same may be moved into and out of operative positions and to so construct these members that movement thereof may be accomplished manually by a single person.

The structure providing this auxiliary support or ramp comprises a pair of channel members 35 which extend transversely of the track members 11 and are welded or otherwise fixed to the under faces of the flanges 16 of these track members, as clearly illustrated in Figs. 2, 3 and 4 of the drawings. These channel members 35 project laterally beyond the track members and have their end portions 35ᵃ inclined toward each other. At their outer ends the inclined portions 35ᵃ of the members 35 are welded to the lower ends of vertically arranged posts 36, it being understood that one of these posts is provided at each side of the semi-trailer as shown in Fig. 3 of the drawings. A plate 37 is welded to the under faces of the members 35 and to the lower end of the post 36, while a second plate 38 is welded to the web portion 12 of the adjacent track member and to the post 36 as at 40. For the purpose of reinforcing the mounting of each post 36 a tubular brace 39 is provided, this brace having its lower end welded to the forward end of the adjacent frame member 22 and having its upper end welded to the plate 37 at the lower end of the post. An enclosing plate 41 is preferably provided and is welded to the post 36 and the plates 38 and 39, as clearly illustrated in Figs. 2, 3 and 4 of the drawings.

Each post 36 extends upwardly a substantial distance above the track members 11 and is provided with a vertically arranged series of openings 42. A collar 43 is sleeved on the post 36 and is adapted to be secured in any desired vertical position thereon by means of a bolt 44 engageable through suitable openings in the collar and any one of the openings 42.

The collar 43 constitutes a supporting stop for a tubular member 45 which is rotatably and slidably mounted on the upper end of the post 36. The lower end of member 45 rests on the upper edge of the collar 43 so that the vertical position of the collar 43 determines the vertical position of the member 45, as will be readily apparent.

Fixed as by welding or the like to the upper end of the member 45 is a casting 50, and this casting is provided with a bore or the like 51 for receiving a tube 52. This tube is welded to the casting as at 53 and projects laterally from the same to a position over the adjacent structural element or track member 11. The casting 50 is preferably provided with an overhanging flange portion 54 at its outer free edge, and received behind this flange portion is a ring 55 which is welded as at 56 to a tube 57. This tube 57 is rotatably mounted on the projecting portion of tube 52 and is prevented from longitudinal movement on this tube by the ring 55 which is limited in its movement longitudinally of the tube 52 by the body portion of the casting 50 and the flange 54, as will be readily apparent.

Welded or otherwise fixed to the upper side of the tube 57 is a short channel member 60. The base 61 of this channel member is provided with the openings 62 and positioned with its base 63 resting upon the base 61 of the channel member 60, is a second elongated channel member 64. The base of this last mentioned channel member is provided with a series of openings 65, any two of which may be brought into registration with the openings 62. Bolts 66 engageable in the registering openings 62 and 65 provide means for securing the member 64 to the member 60 for horizontal adjustment with respect thereto.

The member 64 constitutes an auxiliary supporting ramp or track and is of sufficient width to constitute a runway for the wheels of a vehicle, it being understood that two of these runways are provided, one on each side of the semi-trailer spaced apart a sufficient distance to receive the wheels of a vehicle. Each track member 64 is provided with a substantially horizontal portion 67 which is secured to its corresponding supporting member 60 and is provided with an inclined portion 68 which extends downwardly to substantially the plane of the adjacent track member 11. A channel member 69 is welded to the inner edge of each member 64 and constitutes not only a reinforcing member for the same, but also a guide for the wheels of vehicles on the runway. Further, a short section 70 of channel-shaped cross section is welded at the forward end of each track member and is inclined upwardly, as clearly illustrated in Fig. 2 of the drawings, to constitute a stop adjacent the forward end of each track member. Fixed at spaced points transversely of the portion 68 of each track member 64 are angle bars 71 to provide traction for the wheels of vehicles driven up the inclined portions of these tracks, while welded to each member 69 adjacent the upper end thereof is an angle plate 72 with which a chain may be engaged for anchoring the wheel of a vehicle on the portion 67 of the track member.

As brought out before, the lower end of each track member 64 terminates adjacent one of the track members 11. Instead, however, of resting directly on the web portion of each respective track member 11, the lower end of each track member 64 rests on the web 75 of a channel member 76. This channel member has inclined end portions 77 which are welded to the web 12 of its respective track section 11 and constitutes a slightly elevated runway on the main runway formed by the track member 11 and intermediate the ends of the same, as clearly illustrated in Fig. 2 of the drawings. Suitable reinforcing plates 78, positioned between the web 12 and the under face of the web 75 of the member 76, tends to reinforce the latter intermediate its ends.

Welded to the under face of the flange 14 of each track member 11 adjacent the member 76 is a longitudinally extending angle plate 80. The downturned flange 81 of this angle plate 80 is provided with a series of recesses 82 for engagement by the hooked end 83 of a member 84. The upper end of this member passes through an opening 85 formed in a plate 86 welded to the lower end of the adjacent channel member 69, and the upper end of each rod or member 84 is threaded to receive a nut 87. The arrangement is such that when the hook 83 is engaged in one of the recesses 82, the nut 87 may be tightened against the lug 86 to hold the lower end of the track section 64 in firm engagement with the member 76. Suitable reinforcing webs 89 are welded to the inner face of the flange 81 of the member 80 and to the inner face of the flange 13 of the adjacent track member 11 to reinforce the member 80, as will be readily apparent.

As illustrated in Figs. 2 and 6 of the drawings, a guide rail 90 may be bolted as at 91 to the flange 14 of each track member 11 adjacent the lower end of each track member 64. Additional guide rails 92 may be bolted to the outer faces of the flanges 13 of the track members in advance of the guide rails 90.

To releasably lock the member 45 against rotation on the post 36, there may be provided a locking plunger 95 mounted for reciprocation in a housing 96 fixed to the member 45. A spring 97 tends to force the locking pin inwardly through an opening 98 formed in the member 45 and into engagement with one of the openings 42 in the post 36.

The stem 100 of the plunger 95 is provided on its outer free end with a transversely extending grip 101, and to provide means for holding the plunger in retracted position when desired, a plate 102 is fixed to the outer end of the housing 96 and is provided in its free edge with a notch 103 for receiving the member 102 in one position of rotative adjustment of the stem 100. The arrangement is such that the stem 100 may be rotatably adjusted to engage the member 101 in the recess 102 to thus hold the plunger retracted, as illustrated in Fig. 8 of the drawings. When, however, it is desired to lock the member 45 against rotation, the plunger may be drawn slightly outwardly against the tension of spring 97 and then rotatably adjusted to disengage the member 101 from the member 102, after which the spring 97 may force the plunger inwardly to engage the openings 98 and 42 in the members 45 and 36 respectively.

From the above it is believed that the structure and operation of the invention will be clearly apparent. Each auxiliary ramp or runway is mounted for horizontal adjustment with respect to its support 60 and is also mounted for vertical adjustment on its respective supporting post 36. Further, each ramp member is mounted for substantially universal movement, being rotatable about the axis of its respective supporting post and being also rotatable about its respective supporting tube 52.

When it is desired to load the semi-trailer, the plungers 95 are moved to releasing position, and each track or ramp member 64 is swung laterally out of vertical alignment with its respective track member 11 to the position shown in dotted lines in Fig. 4 of the drawings. This movement of the members 64 is permitted by rotation of the members 45 on the upper ends of posts 36. Further, when the ramps are in their inoperative positions, they may be supported by resting the lower end thereof on the ground, this movement being permitted by rotation of the tubes 57 on the tubes 52. The rings 55 will maintain the ramps in assembled position during this movement to inoperative position, as will be readily apparent.

With the adjustable ramps in inoperative position, a vehicle may be run longitudinally of the runway provided by the members 11 to a position adjacent the forward end of this runway. This vehicle is designated in Fig. 1 of the drawings by the reference character A, and it will be noted that one end of this vehicle will project rearwardly slightly beyond the posts 36. It is preferable to back the vehicle A on to the runway so that the lower hood portion of the vehicle will be adjacent the posts 36.

The adjustable ramps 64 may then be swung to their operative positions and may be locked against rotation out of these positions by the plungers 95. Further, the lower end of each adjustable ramp may be clamped against the track portion of its respective member 76 by engaging the hook portion 83 of rod 84 in the proper recess 82 and by then tightening nut 87. The second vehicle, designated by the reference character B may then be driven on the main runway and up the ramp 64 to a position where the front wheels of this vehicle are positioned on the substantially horizontal portions of these ramps. Obviously, this vehicle may be secured in position by engaging suitable chains with the front wheels thereof and with the lugs 72.

The third and fourth vehicles, designated by the reference characters C and D respectively, may then be run on to the remainder of the main runway, the portions 11ª of this runway being elevated to vehicle supporting position after positioning the vehicle D thereon in the manner described in my previously mentioned application.

It will be noted that the adjustable ramps are not only mounted for substantially universal movement so that they may be swung to operative and inoperative positions (but are also mounted for vertical and horizontal adjustment to provide for positioning of the forward end of vehicle B at a sufficient elevation to clear the adjacent end of vehicle A and to provide for the supporting of vehicles varying greatly in length. Thus by properly vertically adjusting the collars 43 on posts 36, the members 45 and the upper ends of the ramps may be raised or lowered as desired, while, by properly adjusting the ramps on their supports 60, the loading space at the rear end of the trailer may be varied to accommodate vehicles of different length. A series of notches 82 provide for clamping of the lower ends of the ramps in position regardless of the vertical and horizontal positioning of the forward ends of the ramps, it being understood that the notches 82 and openings 62 and 65 are properly spaced so that the hooks 83 may always be engaged with the recesses regardless of the positioning of the ramps.

While the invention has been described with some detail, it is to be clearly understood that the description is for the purposes of illustration only and is not definitive of the limits of the inventive idea. The right is reserved to make such changes in the details of construction and arrangement of parts as will fall within the purview of the attached claims.

What I claim as my invention is:

1. In a transportation means of the class described, means providing a runway of sufficient length to receive a plurality of vehicles arranged end to end, auxiliary track sections intermediate the ends of said runway having portions inclined upwardly from substantially the plane of said runway, said auxiliary track sections constituting a ramp for supporting one end of a vehicle in substantial overlapping relation with respect to the adjacent end of a vehicle supported on said runway, and means for supporting the elevated ends of said track sections, whereby said sections may be swung laterally beyond the sides of said runway to permit an automobile to be driven on said runway past said supporting means and sections.

2. In a transportation means of the class described, means providing a runway of sufficient length to receive a plurality of vehicles arranged end to end, a vertically arranged post on each side of said runway and projecting to a substantial distance above the same, a sleeve rotatably mounted on the upper end of each post, and an auxiliary track section carried by each sleeve, said auxiliary track sections constituting a ramp intermediate the ends of said runway for supporting one end of a vehicle in subtantial overlapping relation with respect to the adjacent end of a vehicle supported on said runway.

3. In a transportation means of the class described, longitudinally extending structural elements providing a runway of sufficient length to receive a plurality of vehicles arranged end to end, a vertical post adjacent the outer side of each longitudinally extending structural element, a track section carried by and rotatable in a horizontal plane about each post, and means for locking each track section against rotation.

4. In a transportation means of the class described, longitudinally extending structural elements providing a runway for receiving vehicles to be transported, a post supported vertically adjacent the outer side of each longitudinally extending structural element, a collar vertically adjustable on each post, a sleeve rotatably mounted on each post and supported on the collar of its respective post for vertical adjustment therewith, and a track section carried by each sleeve.

5. In a transportation means of the class described, means providing a runway of sufficient length to receive a plurality of vehicles arranged end to end, posts arranged vertically on opposite sides of said runway and projecting to a substantial distance above the same, a sleeve rotatably mounted on the upper end of each post, a track section carried by each sleeve, each track section having a portion inclined downwardly from the upper end of its respective post to adjacent the plane of said runway, and means including a pin associated with each sleeve and engageable in an opening in its respective post for locking the sleeve against rotation.

6. In a transportation means of the class described, means providing a main runway of sufficient length to receive a plurality of vehicles arranged end to end, a pair of auxiliary track sections associated with said runway for supporting a vehicle in substantially overlapping relation with respect to a vehicle on said runway, and means mounting each auxiliary track section for substantially universal movement with respect to said main runway.

7. In a transportation means of the class described, means providing a runway of sufficient length to receive a plurality of vehicles arranged end to end, means including an auxiliary track section providing a ramp intermediate the ends of said main runway, and means mounting said auxiliary track section for rotative movement about axes vertically and longitudinally positioned with respect to said main runway whereby said auxiliary track section may be moved to operative and inoperative positions.

8. In a transportion means of the class described, means providing a main runway of sufficient length to receive a plurality of vehicles arranged end to end, posts arranged vertically on opposite sides of said main runway and projecting to a substantial distance above the same, a support carried by each post adjacent the upper end thereof and mounted for rotative movement about the axis of the post, and an auxiliary track section rotatably mounted on each support.

9. In a transportation means of the class described, means providing a main runway of sufficient length to receive a plurality of vehicles arranged end to end, posts arranged vertically on opposite sides of said runway and projecting to a substantial distance above the same, a sleeve rotatably mounted on the upper end of each post, a casting fixed to each sleeve, a tube fixed to each casting and projecting beyond the same, a member rotatably mounted on each tube, and a track section fixed to each member for rotation about each tube and for rotation with each tube about the axis of its respective supporting post.

10. In a transportation means of the class described, means providing a runway of sufficient length to receive a plurality of vehicles arranged end to end, a post projecting vertically above said runway on one side thereof, a sleeve rotatably mounted on the upper end of said post, a casting fixed to said sleeve and having a socket portion arranged to one side of said post and a flange portion projecting beyond said socket portion, a tube welded in the socket portion of each casting and projecting laterally beyond the same, a second tube rotatably mounted on said first mentioned tube, a ring on said second tube positioned behind the flange on said casting to prevent movement of said second tube longitudinally of said first mentioned tube, a support fixed on said second mentioned tube, and a track section adjustably fixed to said support.

11. In a transportation means of the class described, a runway for receiving vehicles to be transported, posts extending upwardly from opposite sides of the runway, and a ramp for one of the vehicles to be carried mounted for rotary, longitudinal and vertical movements upon said posts.

12. In a transportation means of the class described, a runway for receiving vehicles to be transported, posts extending upwardly from opposite sides of the runway, and a ramp for one of the vehicles to be carried mounted for both rotary and vertical movements upon said posts.

13. In a transportation means of the class described, a runway for receiving vehicles to be transported, posts extending upwardly from opposite sides of the runway, and a ramp for one of the vehicles to be carried supported upon said posts and mounted for rotary movements about both vertical and horizontal axes.

14. In a transportation means of the class described, a runway for receiving a plurality of vehicles arranged end to end, posts extending upwardly upon the outer sides of said runway, and means between said posts above said runway for supporting one of the vehicles to be carried including a ramp carried by the posts, movable vertically relative to the runway and movable about the posts laterally with respect to the runway so as to afford clearance for an automobile driven lengthwise of the runway between said posts.

15. In a transportation means of the class described, a runway of sufficient length to receive a plurality of vehicles arranged end to end, cross bars secured to said runway and projecting laterally beyond opposite sides thereof, posts rising from said cross bars, and ramp sections located between and mounted for substantially universal movement relative to said posts.

16. In a transportation means of the class described, a runway of sufficient length to receive a plurality of vehicles arranged end to end, posts extending upwardly upon the outer sides of said runway, and means located between said posts for supporting one of the vehicles to be carried, including ramp sections carried by the upper ends of said posts and movable laterally from an operative position in engagement with the runway to an inoperative position in engagement with the ground.

17. In a transportation means of the class described, a runway of sufficient length to receive a plurality of vehicles arranged end to end, upright posts at the outer sides of said runway, members mounted to turn about and movable longitudinally of said posts, ramp sections above the runway between the posts, and supports for the ramp sections including pivot elements carried by the members aforesaid.

18. In a transportation means of the class described, a runway of sufficient length to receive a plurality of vehicles arranged end to end, posts extending upwardly from the outer sides of said runway, ramp sections between said posts above said runway, and supports for said sections carried by said posts permitting the sections to be raised and lowered relative to the runway and to be swung laterally outwardly beyond the outer sides of the runway to afford clearance for a vehicle upon the runway, including members mounted to turn upon and move longitudinally of said posts, and pivot elements for said sections carried by said members.

19. In a transportation means of the class described, a runway for receiving vehicles to be transported, upright posts supported upon the outer sides of said runway, ramp sections above the runway, and supports for the ramp sections including posts extending upwardly upon the outer sides of said runway, and horizontal pivots for the ramp sections mounted for both horizontal and vertical movements upon said posts.

20. In a transportation means of the class described, a runway for receiving vehicles to be transported, upright posts supported upon the outer sides of said runway, members mounted for both rotary and longitudinal movements on the posts and having lateral extensions, rotary elements carried by the extensions, and ramp sections connected to said rotary elements so as to move therewith.

21. In a transportation means of the class described, a runway for receiving vehicles to be transported, upright posts supported upon the outer sides of said runway, ramp sections movable relative to each other above the runway, and supporting means for said ramp sections including members mounted for both rotary and longitudinal movements on said posts.

22. In a transportation means of the class described, a runway for receiving vehicles to be transported, upright posts supported upon the outer sides of said runway, ramp sections between said posts and movable relative to each other over said runway, and supporting means for said ramp sections including members mounted for both rotary and longitudinal movements on the posts and having lateral extensions, and rotary elements extending longitudinally of the extensions and connected to said ramp sections.

23. In a transportation means of the class described, a runway for receiving vehicles to be transported, upright posts supported upon the outer sides of said runway, members mounted for both rotary and longitudinal movements on the posts and having lateral extensions, rotary elements extending longitudinally of the extensions, members extending across and fixed to said rotary elements, and ramp sections mounted for longitudinal movement on said last mentioned members.

24. In a transportation means of the class described, a runway for receiving vehicles to be transported, a ramp section movable over said runway, and supporting means for said section including a post supported upon an outer side of the runway, a member mounted for both rotary and longitudinal movements on the post and having a lateral extension, and a seat for a portion of said ramp section mounted for rotary movement about said extension.

25. In a transportation means of the class described, a runway for receiving vehicles to be transported, substantially parallel cross bars secured to said runway and having end portions projecting laterally beyond one side thereof and inclined toward each other, an upright post between and welded to said inclined end portions, a seat for the post including a horizontal plate welded to the under sides of said inclined ends and to the lower end of said post, and an enclosure for the lower end of the post including a vertical plate curved around and welded to the post and having opposite ends thereof flat against and welded to the inclined end portions of said cross bars and to opposite edges of the horizontal plate aforesaid.

In testimony whereof I affix my signature.

IRVING H. JUDD.